(12) United States Patent
Horibata

(10) Patent No.: US 8,320,231 B2
(45) Date of Patent: Nov. 27, 2012

(54) RECORDING APPARATUS AND RECORDING METHOD

(75) Inventor: Yoshihiro Horibata, Kanagawa (JP)

(73) Assignee: Sony Corporation, Tokyo (JP)

( * ) Notice: Subject to any disclaimer, the term of this patent is extended or adjusted under 35 U.S.C. 154(b) by 28 days.

(21) Appl. No.: 12/869,140

(22) Filed: Aug. 26, 2010

(65) Prior Publication Data

US 2011/0075540 A1 Mar. 31, 2011

(30) Foreign Application Priority Data

Sep. 25, 2009 (JP) ................. 2009-221447

(51) Int. Cl.
*G11B 7/00* (2006.01)
(52) U.S. Cl. ............... 369/275.3; 369/47.53; 369/53.17; 369/53.19
(58) Field of Classification Search ............... 369/53.11, 369/53.12, 53.13, 53.15, 53.17, 53.19, 53.26, 369/47.5, 47.51, 47.53, 116, 275.3
See application file for complete search history.

(56) References Cited

U.S. PATENT DOCUMENTS

| 5,548,572 A * | 8/1996 | Kulakowski et al. ...... 369/47.52 |
| 6,314,067 B1 * | 11/2001 | Chung et al. ............... 369/44.32 |
| 7,203,153 B2 | 4/2007 | Kuraoka et al. |
| 2005/0007920 A1 * | 1/2005 | Kim et al. .................... 369/47.41 |
| 2005/0243690 A1 * | 11/2005 | Lee et al. .................... 369/275.3 |
| 2006/0153055 A1 * | 7/2006 | Suh ............................. 369/275.1 |
| 2006/0291352 A1 * | 12/2006 | Murakami et al. ......... 369/47.53 |

FOREIGN PATENT DOCUMENTS

| JP | 2004-280864 | 10/2004 |
| JP | 2007-272988 | 10/2007 |

* cited by examiner

*Primary Examiner* — Thomas Alunkal
(74) *Attorney, Agent, or Firm* — Oblon, Spivak, McClelland, Maier & Neustadt, L.L.P.

(57) ABSTRACT

A recording apparatus that performs recording of data on a disc-shaped recording medium including a recording area, which is capable of recording user data therein, and a replacement area, which is replaced by a defect area included in the recording area, includes a setting section configured to replace a portion of the recording area by the replacement area, and set the portion of the recording area as an area for adjustment, and an adjustment section configured to perform adjustment by using the area for adjustment.

13 Claims, 12 Drawing Sheets

FIG. 6

| BYTE LOCATION | CONTENT | NUMBER OF BYTES |
|---|---|---|
| 0 | DDS IDENTIFIER = "DS" | 2 |
| 2 | DDS FORMAT NO. | 1 |
| 3 | RESERVED (00h) | 1 |
| 4 | NUMBER OF EXECUTIONS OF DDS UPDATING (= SERIAL NUMBER OF LAST TDDS) | 4 |
| 8 | RESERVED (00h) | 8 |
| 16 | DRIVE AREA START PHYSICAL SECTOR ADDRESS (AD_DRV) IN DMA | 4 |
| 20 | RESERVED (00h) | 4 |
| 24 | DEFECT LIST START PHYSICAL SECTOR ADDRESS (AD_DFL) IN DMA | 4 |
| 28 | RESERVED (00h) | 4 |
| 32 | START PHYSICAL SECTOR ADDRESS OF USER DATA AREA | 4 |
| 36 | END LOGICAL SECTOR ADDRESS OF USER DATA AREA | 4 |
| 40 | SIZE OF INNER-CIRCUMFERENCE-SIDE FIRST-LAYERED REPLACEMENT AREA (ISA0) | 4 |
| 44 | SIZE OF OUTER-CIRCUMFERENCE-SIDE REPLACEMENT AREA (OSA0, OSA1) | 4 |
| 48 | SIZE OF INNER-CIRCUMFERENCE-SIDE SECOND-LAYERED REPLACEMENT AREA (ISA1) | 4 |
| 52 | REPLACEMENT AREA AVAILABLE FLAG | 1 |
| 53 | RESERVED (00h) | 65483 |

1 SECTOR (65536 BYTES)

RECORDING APPARATUS AND RECORDING METHOD

BACKGROUND OF THE INVENTION

1. Field of the Invention

The present invention relates to recording apparatuses and recording methods for recording signals on recording media, such as optical discs.

2. Description of the Related Art

With respect to technologies for recording and reproducing digital data, there have been data recording technologies, in which optical discs, such as a compact disc (CD) and a digital versatile disc (DVD), are used as recording media. For such optical discs, there have been two types of optical discs, one being a reproduction-dedicated type of optical discs, such as a CD, a compact disc-read only memory (CD-ROM) and a digital versatile disc-read only memory (DVD-ROM), the other one being a user-data recordable type of optical discs, such as a mini disc, a compact disc-recordable (CD-R), a compact disc-rewritable (CD-RW), a digital versatile disc-recordable (DVD-R), a digital versatile disc-rewritable (DVD-RW), a digital versatile disc+rewritable (DVD+RW) and a digital versatile disc-random access memory (DVD-RAM).

It is made possible for such a recordable type of optical discs to record user data therein by applying a recording method to optical discs, such as a magnetooptic recording method, a phase change recording method, or a pigmented coat change recording method. The pigmented coat change recording method, which is also called a write-once recording method, enables recording of data only once, but disables rewriting of the recorded data, and thus, is suitable for use in data storage and the like. In contrast, the magnetooptic recording method and the phase change recording method each enable rewriting of data, and thus, are widely used in various applications including an application for recording various kinds of content data, such as music, videos, games and application programs.

Furthermore, nowadays, realizations of optical discs each having a high storage capacity have been attempted, and a high-density optical disc, which is called a Blu-ray Disc (a trademark of Sony Corporation), has recently been developed. For example, such a high-density optical disc is capable of recording data of a size of around 23.3 GB (gigabytes) on a disc of a diameter of 12 cm in the case where recording and reproduction of data is performed under the condition in which a laser of a wavelength of 405 nm (which is a so-called blue color laser) and an object lens of an NA of 0.85 are combined therein, and a format thereof is such that a track pitch is 0.32 µm, a linear density is 0.12 µm/bit, a data block of a size of 64 KB (kilobytes) is handled as one unit of recording or reproduction of data, and a format efficiency is approximately 82%.

Further, in the case where a format thereof except a linear density is the same as that described above and the linear density is 0.112 µm/bit, such a high-density optical disc is capable of recording data of a size of around 25 GB. Further, by increasing the number of recording layers to two, it is possible to realize an optical disc having a high storage capacity of 46.6 GB or 50 GB, which is twice that of the corresponding optical disc described above. Naturally, by increasing the number of recording layers to three, four, . . . , n, it is possible to realize an optical disc having a high storage capacity resulting from multiplying 23.3 GB or 25 GB by "n". For such a high-density optical disc, a write-once type of optical disc, which is called a Blu-ray Disc-recordable (BD-R), and a rewritable type of optical disc, which is called a Blu-ray Disc-rewritable, have been also developed.

In addition, in this specification document, in optical discs each being capable of recording user data therein, a write-once type of optical discs, such as the CD-R, the DVD-R and the BD-R, is called "a write-once disc" as a whole, and a rewritable type of optical discs, such as the CD-RW, the DVD-RW and the BD-RE, is called "a rewritable disc" as a whole.

In addition, herein, reference patent documents are provided as follows:

Japanese Unexamined Patent Application Publication No. 2004-280864; and

Japanese Unexamined Patent Application Publication No. 2007-272988

SUMMARY OF THE INVENTION

In disc-shaped recording media each being capable of recording data thereinto, adjustments using recorded RF signals or confirmations of qualities of experimental recording operations are performed by using test areas that are provided in inner and outer circumference areas of a disc. Further, for methods for performing recording tests or tilt adjustments using a middle area, i.e., a user area, a method utilizing amplitudes of tracking error signals (DDP signals), which can be obtained even in the case of unrecorded media, is known to those skilled in the art. However, optimal points obtained by performing adjustments on the basis of amplitudes of the DDP signals are unlikely to correspond to actual lead optimal points, and thus, in order to obtain the actual lead optimal points, it is necessary to appropriately correct the values resulting from the adjustments utilizing amplitudes of the DDP signals. For example, a method, in which a mutual relation between optimal points resulting from adjustments performed on the basis of amplitudes of the DDP signals and optimal points resulting from measurements performed on the basis of jitter components of RF signals is calculated in advance, has been known to those skilled in the art. However, it is necessary to correct DDP optimal points on the basis of the obtained mutual relation, and this necessity leads to a disadvantage in that it takes a long period of time to perform the tilt adjustment.

Further, a method, in which various parameters are followed along with performing reproduction or recording of data, has been considered; however, it takes a long period of time until convergences of the parameters, and thus, this necessity leads to losses of qualities of reproduction or recording performed during the long period of time. In the case of reproduction operations, it is possible to recover the losses by performing retrials, but in the case of recording operations with respect to write-once media, the losses may be crucial.

Accordingly, it is desired to provide a recording apparatus and a recording method, which enable performing highly accurate adjustments by using areas that are provided on recording media and are used for recording user data therein.

A recording apparatus according to an embodiment of the present invention is a recording apparatus that performs recording of data on a disc-shaped recording medium including a recording area, which is capable of recording user data therein, and a replacement area, which is replaced by a defect area included in the recording area, and includes a setting section configured to replace a portion of the recording area by the replacement area, and set the portion of the recording area as an area for adjustment, and an adjustment section configured to perform adjustment by using the area for adjustment. According to an embodiment of the present invention, it is possible to perform adjustment by using a recording area that is capable of recording user data therein.

Preferably, the setting section sets a recording test area, which is used for obtaining an optimal recording condition, as the area for adjustment. In this manner, it is possible to perform recording tests (experimental writing operations) at the middle circumference portions of a recording medium, and further, perform recording tests for all over the areas of a recording medium.

Preferably, the recording area included in the recording medium is segmented into a plurality of regions, recording rates corresponding to the respective regions being different from one another, and the setting section sets the recording test area in an area including a point, at which the recording rate is changed. In this manner, it is possible to obtain optimum recording conditions for different recording rates.

Further, the setting section may set an area for tilt adjustment, which is used for performing tilt adjustment, as the area for adjustment. In this manner, it is possible to obtain information for tilt adjustments by using middle circumference portions of a recording medium, and thereby, it is possible to perform highly accurate tilt adjustments for all over the areas of a recording medium.

In this case, preferably, the setting section sets the area for tilt adjustment at intervals resulting from equally segmenting the recording area.

More specifically, the adjustment section records a signal in the area for tilt adjustment and calculates information for tilt adjustment on the basis of a signal obtained by reproducing the recorded signal.

Further, preferably, a recording apparatus according to an embodiment of the present invention further includes a reproduction section including an optical pick-up for reproducing data from the recording medium, and the setting section sets a trace area as the area for adjustment at a position corresponding to a position at which the optical pick-up is in a waiting condition during a reproduction operation. In this manner, it is possible to allow an optical pick-up to wait on a recording area without substantially giving damages on data recorded on a recording medium. It is possible to reduce an average amount of seeking operations by causing an optical pick-up to wait on a recording area.

Further, in order to reduce an average amount of seeking operations further, the setting section may set the trace area at a center portion or an approximately center portion of the recording area.

As described above, according to an embodiment of the present invention, it is possible to perform adjustments by using areas, in which user data is recorded, of a recording medium, and thereby, it is possible to realize increasing of accuracy of adjustments.

BRIEF DESCRIPTION OF THE DRAWINGS

FIG. 6 is a diagram illustrating a structure of a disc definition structure DDS recorded at the start of a disc management area DMA that is used by a disc drive apparatus according to an embodiment of the present invention;

DESCRIPTION OF THE PREFERRED EMBODIMENTS

Hereinafter, a disc drive apparatus, which is an example of a recording apparatus according to an embodiment of the present invention, will be described.

First Embodiment

[1. Outline of Recording Test Method Using Replacement System]

Firstly, an outline of a recording test method using a replacement system for defects, provided in a disc drive apparatus according to this embodiment.

Figure 1:
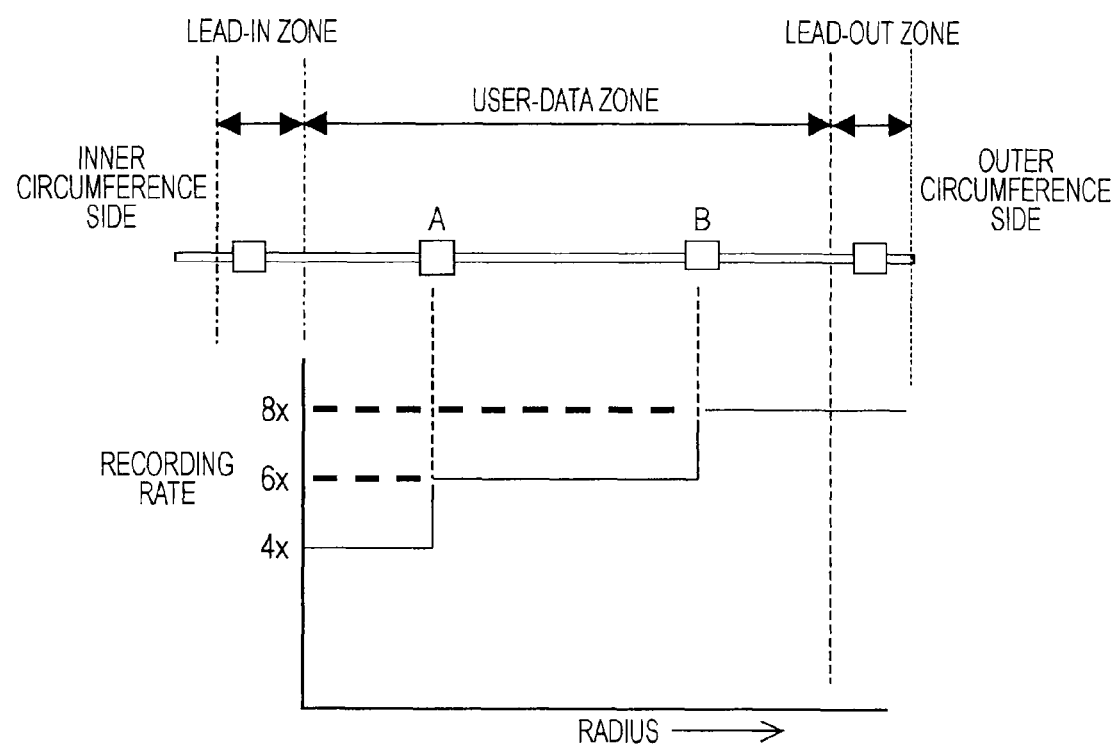
FIG. 1 is a diagram illustrating an outline of a recording test performed by a disc drive apparatus according to an embodiment of the present invention.

In FIG. 1, a horizontal axis denotes the radius direction of a disc, and the left side and the right side of the horizontal axis denote the inner circumference side and the outer circumference side of the disc, respectively. It is assumed that, owing to restricted rotation numbers of a disc drive apparatus, recording speeds are set for each of a plurality of areas that are segmented in accordance with positions on the radius-direction axis of the disc. However, this is not typically necessary. In the case where the recording speed is constant all over the areas, a recording test method using a replacement system, according to this embodiment, can also be applied. This embodiment will be described below by an example, in which the entire area of a disc is segmented into three recording areas, for which recording of data can be performed at respective three kinds of recording rates such as a quad speed, a sextuple speed and an octuple speed relative to a reference recoding rate.

Usually, recording tests are performed by using test write areas, each being denoted by "OPC 0" (refer to FIG. 4), which are located in a lead-in zone and a lead-out zone that are provided at the inner circumference side and the outer circumference side of a disc, respectively. Therefore, in an example of FIG. 1, it is possible to perform three kinds of recording tests, a first one being quad-speed recording tests each using a quad-speed area, a second one being sextuple-speed recording tests each using an octuple-speed area, a third one being octuple-speed recording tests each using an octuple-speed area. However, there is a difficulty, in which recording tests using the test write area included in the lead-out zone are likely to be affected by a seeking time necessary for back-and-forth operations for areas at the inner circumference side and areas at the outer circumference side of a target disc, a warpage of a target disc (a portion not adjusted by tilt adjustments), a surface condition of a target disc (stains and the like), and the like. Therefore, a method, in which the quad-speed recording test is performed by using the test write area OPC included in the lead-in zone, and by performing arithmetic operations on the basis of the result of the quad-speed recording test, results of the sextuple-speed recording test and the octuple-speed recording test are obtained, is frequently adopted.

A disc drive apparatus according to this embodiment is configured to, in order to enable performing recording tests using a user data zone between the lead-in zone and the lead-out zone, replace portions of the user data zone by the corresponding replacement areas, and set the portions of the user data zone as areas for recording tests, which are also areas for adjustments. For the areas for recording tests to be set in the user data zone, in the case where, for example, the entire area of a target disc is segmented into three areas, for which recording of data can be performed at respective three kinds of recording rates such as a quad speed, a sextuple speed and an octuple speed, it is preferable to set an area including points at which the quad-speed recording of data and the sextuple-speed recording of data are switched, and an area including points at which the sextuple-speed recording of data and the octuple-speed recording of data are switched. Such a method as described above enables determining optimal recording conditions for respective quad-speed recording operations, sextuple-speed recording operations and octuple-speed recording operations on the basis of actual measurement values obtained by performing the recording tests. Further, such a method as described above enables shortening of the seeking time, reduction of the influence of the warpage of a target disc, and further, removal of the influence of the surface condition of a target disc.

Hereinafter, a recording method using a disc drive apparatus and a replacement system according to this embodiment will be described in more detail.

[2. Disc Drive Apparatus]

Firstly, a configuration of a disc drive apparatus 10 according to this embodiment will be described below.

Figure 2:
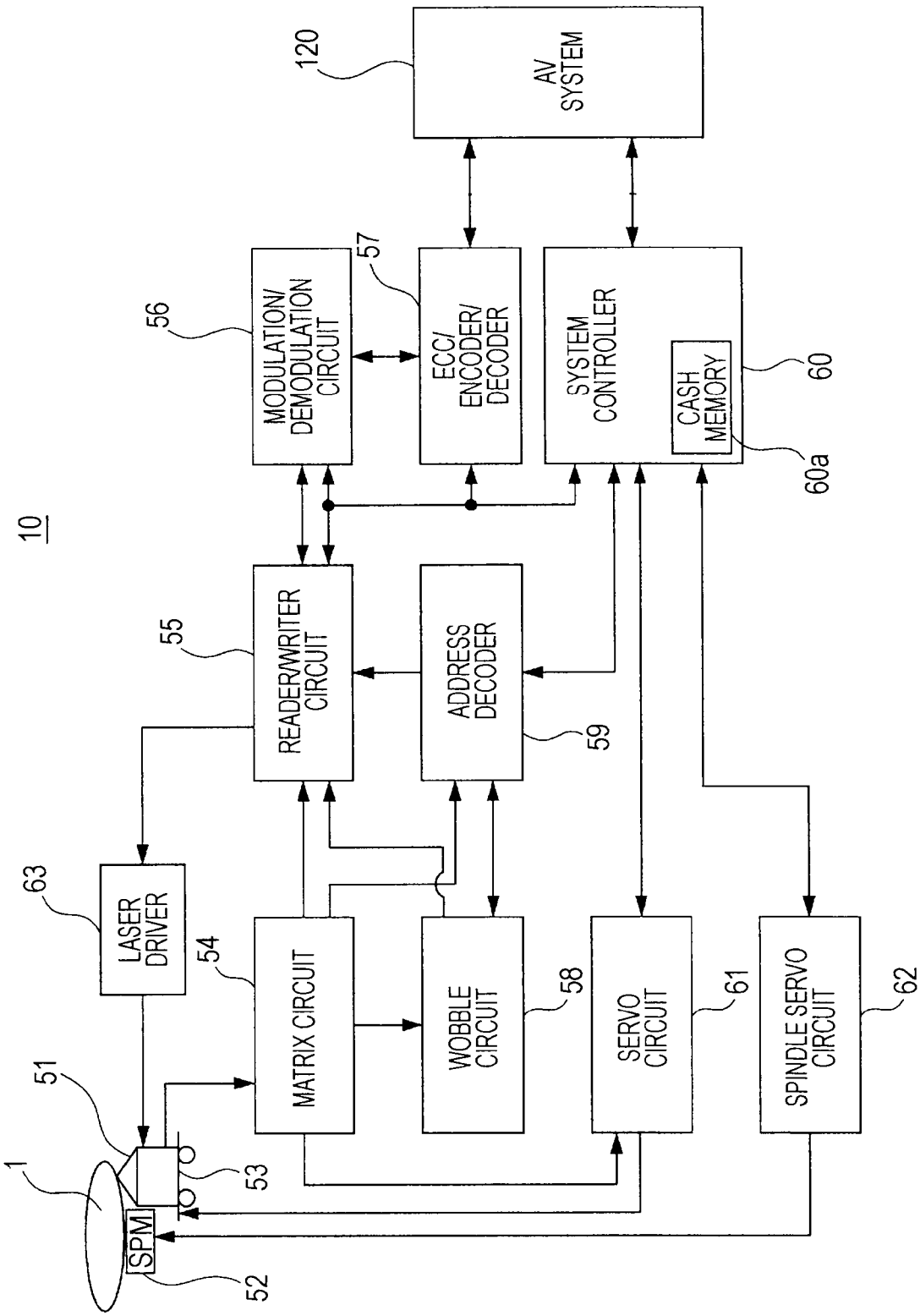
FIG. 2 is a diagram illustrating a configuration of a disc drive apparatus according to an embodiment of the present invention.

FIG. 2 is a diagram illustrating a configuration of a disc drive apparatus according to this embodiment.

A disc 1, which is a recording medium, is supposed to be, for example, a write-once disc or a rewritable disc, such as a BD-R or a BD-RE. The disc 1 is loaded onto a turn table (which is omitted from illustration), and is rotation-driven by a spindle motor 52 with, for example, a constant linear velocity when recording or reproduction of data is performed.

Further, when recording of data is performed, data is recorded on tracks that are formed on the disc 1 by an optical pick-up (an optical head) 51 as pigment-change pit marks or phase-change marks, and when reproduction of data is performed, recording marks are read out by the optical pick-up 51.

Further, on the disc 1, recording tracks are formed of grooves that are formed in a spiral shape, and forming these grooves in a wobbling condition on the basis of signals resulting from modulation of information allows recording of address-in-pregroove (ADIP) information, which is dedicated to reproduction. Further, this pregroove information is also read out by the optical pick-up 51. Furthermore, on the disc 1, as management information dedicated to reproduction, for example, physical information relating to a disc and the like is recorded in the form of emboss pits or wobbling grooves, and this information is also read out by the optical pick-up 51.

The optical pick-up 51 is configured to include therein a laser diode functioning as a laser light source, a photo detector for detecting reflected laser light beams, an object lens functioning as an output termination of laser light beams, and an optical system (omitted from illustration), which irradiates laser light beams towards the recording surface of a disc through the object lens, and conducts reflected laser light beams towards the photo detector. The laser diode outputs so-called blue-color laser beams having a wavelength of 405 nm. Further, an NA of the optical system is 0.85.

In the optical pick-up 51, the object lens is held by a triaxial actuator so that the object lens can be shifted in an optical axis direction (in a focus direction), in a disc radius direction (in a tracking direction), and in a tilt direction. Here, the tilt direction is a tilt direction in a radial direction of the disc 1, and in other words, the tilt direction is a rotation direction around an axis that is extended in a tangential direction orthogonal to the focus direction and the tracking direction. The entire optical pick-up 51 is configured so that it can be shifted in the disc radius direction.

The laser diode included in the optical pick-up 51 is driven so as to emit laser light beams by drive signals (drive currents) from a laser driver 63.

Further, information included in the reflected light beams from the disc 1, which is detected by the photo detector included in the optical pick-up 51, is converted into electrical signals in accordance with an amount of received light beams, and is supplied to a matrix circuit 54. The matrix circuit 54 is configured to include therein a current-voltage conversion circuit, a matrix computation/amplification circuit and the like, which correspond to an output current from a plurality of photo-receptors functioning as photo detectors, and generates necessary signals having been subjected to matrix computation processing included therein. For example, high-frequency signals (reproduced data signals) corresponding to reproduced data, focus error signals for servo control, and tracking error signals are generated.

By the way, the above-described triaxial actuator is formed of, for example, a plurality of tracking coils and four focus coils and the like. The focus coils are located at two positions that are displaced by equal distances in the "+" direction and in the "−" direction from the optical-axis position of the object lens, respectively, and further, are located so as to be opposite each other with the object lens being located therebetween in the tangential direction. Here, the two focus coils having a mutual relation, in which the two focus coils themselves are opposite each other with the object lens being located therebetween in the tangential direction, are called "a pair of drive focus coils". That is, the pick-up 51 is configured to include two pairs of drive focus coils therein. The object lens is driven in the focus direction by two driving forces in the focus direction, which are generated by the two pairs of focus drive coils. Further, providing an appropriate difference between the two driving forces generated by the two pairs of focus drive coils results in generation of an appropriate driving force in the tilt direction relative to the object lens, and thus, leads to an appropriate tilt angle adjustment.

Further, the matrix circuit 54 generates signals relating to wobbling of grooves, that is, push-pull signals functioning as signals for detecting wobbling thereof. In addition, sometimes, the matrix circuit 54 is configured so as to be integrated into the optical pick-up 51. The reproduced data signals, the focus error signals and the tracking error signals, and the push-pull signals, which are outputted from the matrix circuit 54, are supplied to a reader/writer circuit 55, a servo circuit 61, and a wobble circuit 58, respectively.

The reader/writer circuit 55 performs binarizing processing on the reproduced data, reproduction clock generation processing using a PLL, and the like, and, reproduces data having been read out by the optical pick-up 51 to supply the reproduced data to a modulation/demodulation circuit 56. The modulation/demodulation circuit 56 is configured to include a function unit functioning as a decoder when reproduction of data is performed, and a function unit functioning as an encoder when recording of data is performed. The modulation/demodulation circuit 56 is configured to, as decoding processing performed when reproduction of data is performed, perform processing for demodulating run-length limited codes on the basis of a reproduction clock. Further, an ECC encoder/decoder 57 performs ECC encoding processing for adding error correction codes when recording of data is performed, and performs ECC decoding processing for performing error corrections when reproduction of data is performed. When reproduction of data is performed, data having been demodulated by the modulation/demodulation circuit 56 is fetched into internal memory, where the demodulated data is subjected to error detection/correction processing, de-interleaving processing and the like, and as a result, reproduced data is obtained. Data having been decoded to reproduced data by the ECC encoder/decoder 57 is read out, and is transferred to a connected device, such as an audio-visual (AV) system 120, in accordance with instructions from a system controller 60.

The push-pull signals, having been outputted from the matrix circuit 54 as signals relating to wobbling of grooves, are processed by a wobble circuit 58. The push-pull signals functioning as ADIP information are demodulated into data streams forming ADIP addresses therein by the wobble circuit 58, and are supplied to an address decoder 59. The address decoder 59 performs decoding of the supplied data, obtains address values, and supplies the obtained address values to the system controller 60. Further, the address decoder 59 generates clocks by performing PLL processing using wobble signals supplied from the wobble circuit 58, and supplies the generated clocks to individual units as encoding clocks used when recording of data is performed.

The push-pull signals, which are outputted from the matrix circuit 54 as signals relating to wobbling of grooves, and function as pre-recorded information PIC, are subjected to band-pass filtering processing in the wobble circuit 58, and the resultant signals are supplied to the reader/writer circuit 55, where the supplied signals are binalized and converted into data streams. Subsequently, the data streams are ECC-decoded and de-interleaved by the ECC encoder/decoder 57, and data functioning as pre-recorded information is extracted. The extracted pre-recorded information is supplied to the system controller 60. The system controller 60 is capable of performing various kinds of setting processing, copy protection processing and the like, on the basis of the read-out pre-decoded information.

When recording of data is performed, record data is transferred from the AV system 120. The record data is transmitted to memory included in the ECC encoder/decoder 57, and there, is buffered. In this case, as encoding processing performed on the record data having been buffered, the ECC encoder/decoder 57 performs processing for adding error correction codes, interleaves, sub-codes and the like. The ECC-encoded data is subjected to, for example, demodulation processing using the RLL (1-7) PP method (RLL: Run Length limited, PP: Parity Preserve/Prohibitrmtr (repeated minimum transition run length)), and the resultant data is supplied to the reader/writer circuit 55. When recording of data is performed, as described above, clocks having been generated from wobbling signals are used as encoding clocks, which are reference clocks for the above-described encoding processes.

The record data resulting from the encoding processes is subjected to recording compensation processing performed by the reader/writer circuit 55, such as fine adjustments of characteristics of recording layers, the shape of a spot of laser light beams, optimal recording power for a linear recording velocity and the like, and an adjustment of the waveform of a laser drive pulse, and subsequently, the resultant record data is transmitted to a laser driver 63 in the form of laser drive pulses. The laser driver 63 supplies the supplied laser drive pulses to a laser diode included in the optical pick-up 51, and thereby, drives the laser diode so that the laser diode emits laser light beams. As a result of the above-described processes, pits in accordance with record data are formed on the disc 1.

In addition, the laser driver 63 is configured to include a so-called auto power control (APC) circuit, and performs control so that the output of the laser can be maintained constant independent of temperature and the like on the basis of the output power of the laser, which is obtained by monitoring the output of a detector for detecting the output of the laser, the detector being included in the optical pick-up 51. Respective target values of the output of the laser when recording of data is performed and when reproduction of data is performed are provided by the system controller 60, and respective output levels of the laser when recording of data is performed and when reproduction of data is performed are controlled so as to reach the target values.

The servo circuit 61 generates various kinds of servo drive signals, such as a focus drive signal, a tracking drive signal and a thread drive signal, on the basis of the focus error signals and the tracking error signals having been outputted from the matrix circuit 54, and causes these servo signals to execute servo operations. That is, the servo circuit 61 generates focus drive signals and tracking drive signals in accordance with the focus error signals and the tracking error signals, and causes these drive signals to drive the focus coils and the tracking coils of the triaxial actuator included in the optical pick-up 51. In this manner, a tracking servo loop and a focus servo loop including the optical pick-up 51, the matrix circuit 54 and the servo circuit 61 are formed.

Further, the servo circuit 61 is configured to include a tilt correction arithmetic operation unit therein. The tilt correction arithmetic operation unit included in the servo circuit 61 appends a difference corresponding to a tilt setting value provided by the system controller 60 to focus control signals, which are supplied to respective pairs of drive focus coils. In this manner, two focus control signals, to which a difference corresponding to the tilt setting value has been appended, are supplied to the two pairs of drive focus coils included in the triaxial actuators, and thereby, the tilt adjustment is performed so that the object lens is driven in the tilt direction.

Further, the servo circuit 60 is configured to, in accordance with a track jump instruction from the system controller 60, cut off the tracking servo loop, output jump drive signals, and thereby, causes execution of track jump operations.

Further, the servo circuit 61 generates thread drive signals on the basis of thread error signals, which are obtained as low-frequency band components of the tracking error signals, access execution control from the system controller 60, and the like, and by using the thread drive signals, drives a thread mechanism 53. The thread mechanism 53 holds the optical pick-up 51, drives a thread motor in accordance with the thread drive signals, and thereby, sifts the optical pick-up 51 in the radius direction of a target disc.

A spindle servo circuit 62 performs control so as to cause a spindle motor 52 to perform CLV rotation. The spindle servo circuit 62 obtains a clock resulting from PLL processing on the wobbling signals as current rotation velocity information relating to the spindle motor 52, and generates the spindle error signals by comparing the clock with predetermined CLV reference velocity information. Further, when reproduction of data is performed, the reproduction clock (i.e., a reference clock for decoding processing), which is generated by the PLL included in the reader/writer circuit 55, is current rotation velocity information relating the spindle motor 52, and therefore, by comparing this reproduction clock with predetermined CLV reference velocity information, it is also possible to generate spindle error signals. Further, the spindle servo circuit 62 outputs spindle drive signals having been generated in accordance with the spindle error signals, and by using the generated spindle drive signals, executes the CLV rotations of the spindle motor 52. The spindle servo circuit 62 generates spindle drive signals in accordance with spindle kick/break control signals from the system controller 60, and by using the generated spindle drive signals, causes the spindle motor 52 to execute operations, such as a start operation, a halt operation, an acceleration operation and a deceleration operation.

The above-described various kinds of operations relating to the servo system and the record and reproduction system are controlled by the system controller 60. The system controller 60 executes various kinds of processes in accordance with commands from the AV system 120.

For example, once a write command is issued by the AV system 120, firstly, the system controller 60 shifts the optical pick-up 51 to an address indicating a position, into which data is to be written. Subsequently, as described above, encoding processing is performed on data having been transferred from the AV system 120 (for example, video data conforming to one of various kinds of standards, such as MPEG2, and audio data). Further, as described above, by supplying the laser drive pulses from the reader/writer circuit 55 to the laser driver 63, recording of data is executed.

Further, for example, once a read command requesting for transfer of certain data (MPEG2 video data and the like) recorded in the disc 1 is supplied from the AV system 120, firstly, the system controller 60 performs seeking operation control targeted for an instructed address. That is, by sending an instruction to the servo circuit 61, the system controller 60 causes the servo circuit 61 to execute access operations targeted for an address indicated by a seek command issued by the servo circuit 61, the access operations being performed by the optical pick-up 51. Subsequently, the system controller performs operation control necessary for data included in a data section corresponding to the instructed address to be transferred to the AV system 120. That is, the system controller 60 performs reading out of data from the disc 1, performs decoding processing, buffering processing and the like on the read-out data by using the reader/writer circuit 55, the modulation/demodulation circuit 56 and the ECC encoder/decoder 57, and transfers the requested data to the AV system 120.

In addition, in an example of a configuration of a disc drive apparatus shown in FIG. 2, the disc drive apparatus is connected to the AV system 120; however, a disc drive apparatus according to an embodiment of the present invention may be a disc drive apparatus connected to a personal computer or the like. Furthermore, a disc drive apparatus according to an embodiment of the present invention may be configured to be connected to no other device. In such a case, a conformation in which an operation unit and a display unit are provided, and a configuration of interface units for inputting/outputting data are different from those shown in FIG. 2. That is, just a condition, in which recording or reproduction of data is performed in accordance with operations performed by users, and further, terminal units for inputting/outputting various kinds of data are provided, is necessary for a disc drive apparatus according to this embodiment.

[3. Management Information Relating to Disc]

Next, a structure of an area and management information with respect to the disc 1 will be described below. Here, as examples of a Blu-ray Disc, an example of a write-once disc and an example of a rewritable disc are provided.

The diameter of the disc 1 is 120 mm, and the disc thickness thereof is 1.2 mm. That is, the outer shape of the disc 1 is just like that of a disc conforming to the CD standard, and that of a disc conforming to the DVD standard. Further, as a result of utilization of a so-called blue-color laser as a laser for recording and reproducing data, and realizations of an optical system having a high NA (which is, for example, 0.85), a narrow track pitch (which is, for example, 0.32 μm) and a high linear density (which is, for example, 0.12 μm), a disc of a diameter of 12 cm, having a user data storage capacity of around 23 Gbytes to 25 Gbytes per one recording layer is realized as the disc 1. The disc 1 according to this example has two kinds of discs, one being a one-layered disc having one recording layer, the other one being a multi-layered disc having a plurality of recording layers, such as a two layered disc, a three layered disc, . . . .

Figure 3:
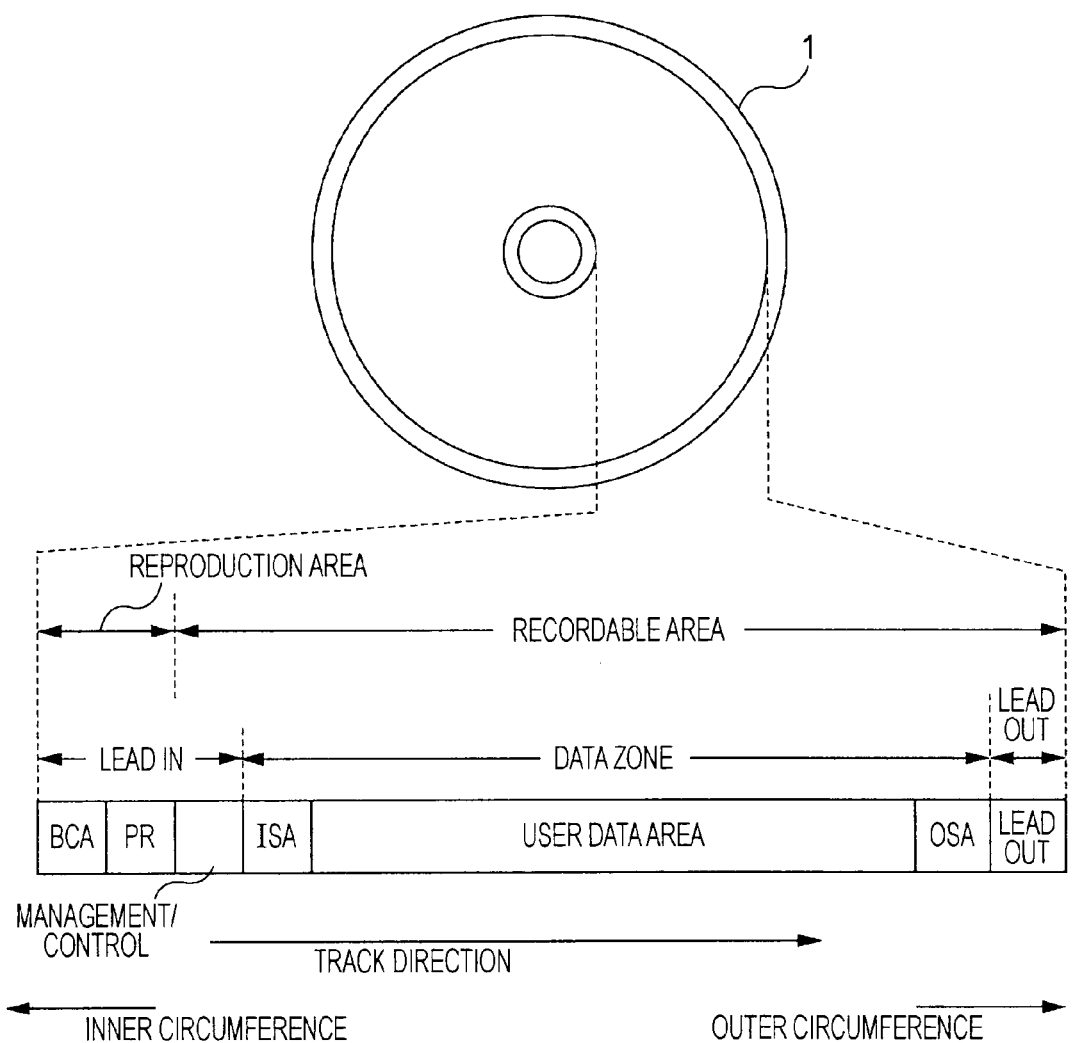
FIG. 3 is a diagram illustrating a structure of an area included in a disc that is used by a disc drive apparatus according to an embodiment of the present invention.

FIG. 3 is a diagram illustrating a structure of an area on the disc 1. The area on the disc 1 includes a lead-in zone, a user data zone and a lead-out zone located from the inner circumference side thereof. The lead-in zone includes a burst cutting area (BCA), pre-decoded information area PR and management/control information area located from the inner circumference side thereof. Here, the BCA and the pre-decoded information area PR are areas dedicated to reproduction, and areas from the management/control information area included in the lead-in zone to the lead-out zone are recordable areas, into which information can be recorded by the disc drive apparatus 10.

The BCA, which is located at the most inner circumference side of the lead-in zone, records therein signals in the form of barcodes in the radius direction by using a recording method, in which, for example, recording layers are burnt out by using a high-power output laser. In this manner, unique IDs are recorded into discs on a disc-by-disc basis. Further, such a unique ID enables management of copying contents into the disc 1.

In the reproduction area except the BCA, that is, in the entire area including the pre-recorded information area PR and the recordable area, recording tracks having wobbling grooves are formed in a spiral shape. The grooves are guides for tracking when tracing is performed by a laser spot. Recording and reproduction of data is performed by using this grooves as recording tracks.

In addition, in this example, optical discs, for each of which data is recorded in the grooves, are assumed; however, an embodiment of the present invention is not limited to such an optical disc adopting the groove recording method, but may be applied to an optical disc adopting a land recording method, in which data is recorded on lands between individual grooves, and an optical disc adopting a land/groove recording method, in which data is recorded in grooves and on lands.

The grooves functioning as recording tracks are formed in a wobbling shape in accordance with wobble signals. The disc drive apparatus is configured to, when shifting a laser spot along with recording tracks, detect positions of both edges of grooves from reflected light rays of the laser spot irradiated to the grooves, extract variation components of the positions of the both edges in the radius direction, and thereby, reproduce a wobble signal. This wobble signal includes address information modulated therein, which is related to the recording track at the record position thereof (a physical address, other appended information and the like: ADIP information). The disc drive apparatus demodulates the above-described address information and the like from the wobble signal, and thereby, performs control of addresses and the like when recording or reproduction of data is performed. Further, the ADIP information includes physical format information relating to the disc itself, such as a class and a size of thereof. Such a physical format information relating to a disc enables the disc drive apparatus 10 to discriminate the class and the size of a disc, when the disc is loaded into the disc drive apparatus 10.

A data zone is an area into/from which user data is actually recorded or reproduced. For discs used in personal computers and the like, when there are any portions thereof, for which recording or reproduction of data is difficult to be performed, a replacement area, by which the portions (sectors or clusters) are replaced, is set in the data zone thereof. Further, it is difficult for write-once media to perform physically rewriting of data, but it is possible for the write-once medium to perform rewriting of data by using the replacement area. A replacement area is provided at the most inner circumference side of the data zone as an inner spare area (ISA), and another replacement area is provided at the most outer circumference side of the data zone as an outer spare area (OSA).

At the outer circumference side of the data zone, a lead-out zone is provided. This lead-out zone is used as a buffer area for absorbing overruns occurred when seeking operations are performed. In addition, in the lead-out zone, information relating to a disc management area (DMA), which will be described below, may be recorded, just like in the lead-in zone.

Such recording and reproduction processing on a one-layered disc, which is executed by the disc drive apparatus, is performed in the direction from the inner circumference side thereof to the outer circumference side thereof. With respect to a recording and reproduction density, for example, a track pitch is made be 0.32 µm, and a linear density is made be 0.12 µm/bit. Further, user data of a size of 64 KB is treated as one cluster, and for each cluster of the user data, recording and reproduction of data is performed. A data zone into/from which user data is recorded and reproduced includes 355,603 clusters. Therefore, the record capacity of user data is 64 KB×355,603=approx. 23.3 GB.

Figure 4:
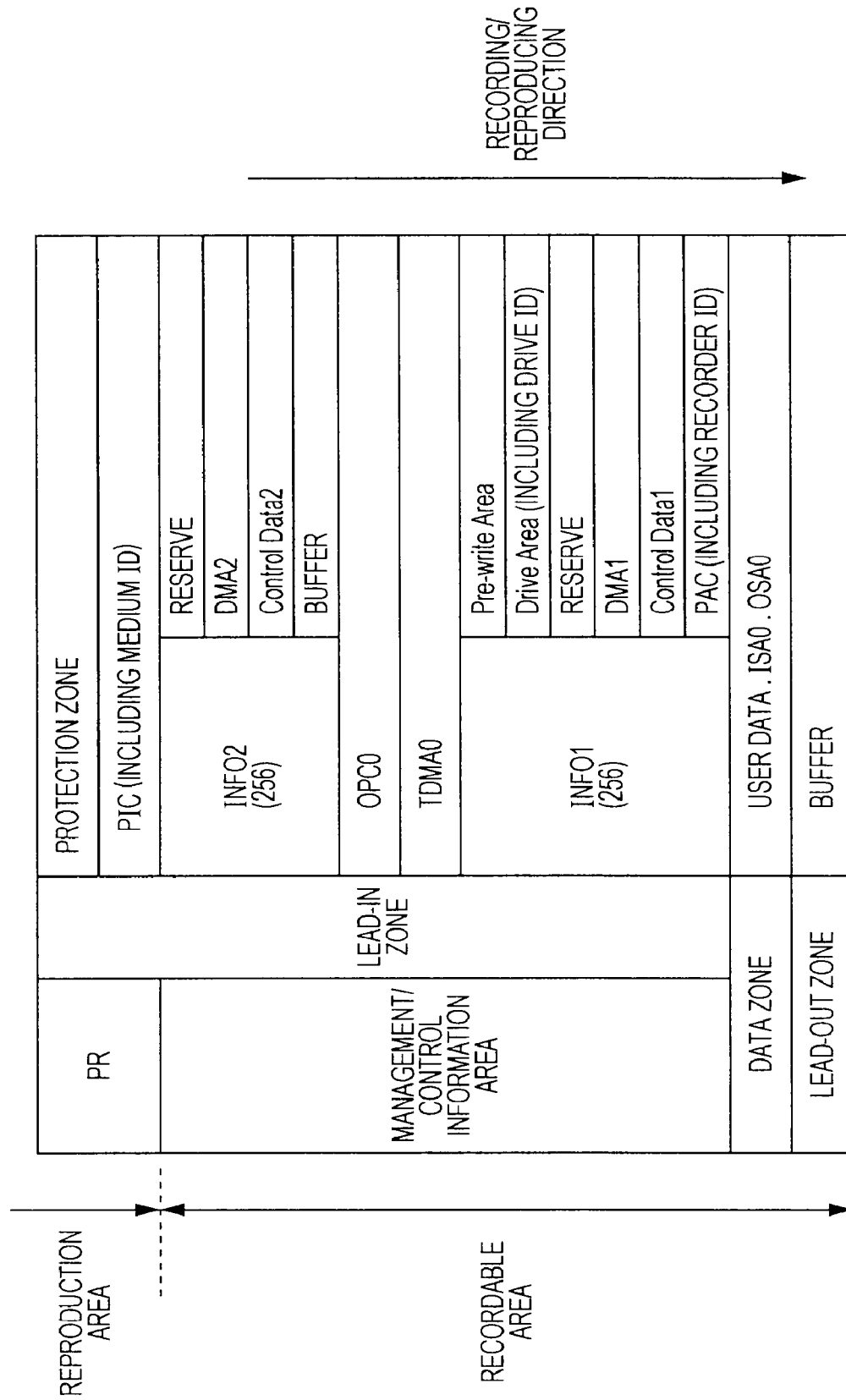
FIG. 4 is a diagram illustrating a structure of a pre-recorded information area PR and a recordable area in a structure of an area included in a disc that is used by a disc drive apparatus according to an embodiment of the present invention.

FIG. 4 is a diagram illustrating a structure of a pre-recorded information area PR and a recordable area included in the area structure of the disc 1, shown in FIG. 3. As shown in FIG. 4, in the pre-recorded information area PR of the reproduction area, as permanent information & calibration (PIC) information, recommended information relating to disc recording conditions, such as a recording and reproduction laser power condition and a laser driving pulse waveform condition, information used for copying protections and the like are recorded in the form of wobbling grooves. In addition, this PIC information may be recorded in the form of emboss pits.

In the management/control information area, from the inner circumference side thereof, an information area Info 2, a test write area OPC 0, a TDMA 0, and an information area Info 1 are sequentially allocated. The test write area OPC 0 is used for experimental writing operations executed when conditions for recording and reproduction of record marks, such as a condition for a laser power outputted when recording and reproduction of data is performed, are set.

The information area Info 2 is configured to include a reserved area, a DMA 2, control data (control data 2) and a buffer.

The information area Info 1 is configured to include a pre-write area, a drive area, a DMA 1, control data (control data 1) and a buffer. In the drive area, it is possible to record a test result obtained by using an area of the data zone, which is set as a replacement area, as a test write area. Details of this operation will be described below.

In each of the two areas of control data (control data 1 and control data 2) that are included in the information areas info 1 and info 2, respectively, a disc type, a disc size, a disc version, a layer structure, a length of channel bits, a piece of BCA information, a transfer rate, a piece of data zone location information, a linear recording velocity, a piece of recording/reproduction laser power information, and the like are recorded in the same format. Here, a piece of information relating to the linear recording velocity is an optimal value for each zone that is segmented in accordance with a radius position thereof within the recordable area. Therefore, a plurality of pieces of information relating to the linear recording speeds are recorded so as to be corresponded to a plurality pieces of information indicating positions of the zones, respectively. For example, in the case where there are three zones, a first one being a zone for which recording of data can be performed at a quad speed, a second one being a zone for which recording of data can be performed at a sextuple speed, a third one being a zone for which recording of data can be performed at an octuple speed, pieces of information indicating the positions of the zones are recorded so as to be corresponded to the respective pieces of information relating to linear recording speeds for the zones.

In each of the two DMAs (the DMA 1 and the DMA 2) that are included in the information areas Info 1 and Info 2, respectively, pieces of replacement management information for managing replacements due to defects, logical rewriting operations and the like, as well as usage conditions of individual areas associated with recording of data, pieces of information necessary to manage addresses of individual areas and the like, are recorded. In the two DMAs (the DMA 1 and the DMA 2), the same contents of information are recorded, respectively.

In addition, in the DMA, pieces of information relating to not only replacement management due to defect points but also management for realization of logical rewriting of data in this write-once disc can be recorded. For this reason, the DMA is called "a disc management area".

In order to enable performing the rewriting of data and the defect management utilizing replacement processing in the write-once disc, the content of the DMA is also updated in accordance with processing for rewriting of data and the like. Therefore, in the write-once disc, a temporary disc management area (TDMA) 0 is provided.

That is, firstly, replacement management information to be recorded in the DMA is recorded into the TDMA 0, and subsequently, the replacement management information is updated by causing a new piece of replacement management information to be additionally recorded in the TDMA 0, every time a process of rewriting of data or a process for replacement due to a defect is performed. Therefore, until closing (finalization) of the disc, the DMA is not used, but the replacement management is executed by using the TDMA 0. In the write-once disc, finally, closing processing is performed, and subsequently, recording of data into the write-once disc is disabled. Further, in this closing processing, the newest pieces of replacement management information that are recorded in the TDMA at the closing timing are recorded in the DMA, and subsequently, the replacement management using the DMA is enabled. On the contrary, in the case of the rewritable disc, since it is possible to rewrite the contents of the DMA in accordance with individual recording operations, any areas each functioning as the TDMA are not provided. In addition, details of the replacement management information to be recorded in the DMA will be described below.

The buffer included in the information area Info 2 is a buffer area for physically separating control data (the control data 2) from the test write area OPC 0. In the drive area included in the information area Info 1, optimal recording and reproduction conditions for the disc are recorded. The optical disc drive apparatus determines the optimal recording and reproduction conditions for the disc, and records the determined optimal conditions in the drive area included in the information area Info 1. Further, subsequently, it is possible for the optical disc drive apparatus to, prior to commencement of recording or reproduction of data, read out the recording and reproduction conditions from the drive area of the information area Info 1, and perform the recording or reproduction of data in accordance with the read-out conditions.

Further, in the case of the write-once disc, a drive ID is recorded in the drive area included in the information area Info 1. This drive ID is a piece of identification information indicating a device type of each of the disc drive apparatuses. That is, a certain disc drive apparatus, which has performed recording processing on the disc 1, records codes indicating a manufacturer's name and the name of a device type of the disc drive apparatus itself as the drive ID. More specifically, the drive ID is a piece of recording-apparatus identification information including a manufacturer's name, the name of a device type, a firmware version and the like, and in the drive area of the disc 1 that has ever been subjected to recording processing in the past, as a result, a history of a disc drive apparatus that performed recording processing on the disc 1 in the past remains as the drive ID. Namely, once the content of the drive ID is confirmed, it is possible to identify the device type of a disc drive apparatus that performed recording processing on the disc 1 in the past.

In addition, in the case of a rewritable disc, an area for recording a recorder ID just like the drive ID is provided in the PAC included in the information area Info 1. That is, each of disc drive apparatuses, which have performed recording processing on the disc 1, records codes indicating a manufacturer's name and the name of a device type of the disc drive apparatus itself as the recorder ID. More specifically, the recorder ID is a piece of recording apparatus identification information including a manufacturer's name, the name of a device type, and a piece of additional identification information, and in the disc 1 that has ever been subjected to recording processing in the past, as a result, each of histories of disc drive apparatuses that performed recording processing on the disc 1 in the past remains as the recorder ID. Namely, once the content of the recorder ID is confirmed, it is possible to identify the device types of disc drive apparatuses that performed recording processing on the disc 1 in the past.

Next, a structure of a DMA will be described below.

Figure 5:
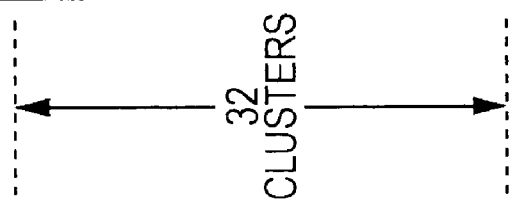
FIG. 5 is a diagram illustrating a structure of a disc management area DMA that is used by a disc drive apparatus according to an embodiment of the present invention.

FIG. 5 is a diagram illustrating a structure of a DMA.

In the DMA, a piece of detailed information relating to a disc is recorded as a disc definition structure (DDS) in each of four cluster sections corresponding to respective cluster numbers 1 to 4.

Further, 28 cluster sections corresponding to respective cluster numbers 5 to 32 are segmented by four cluster sections into recording areas (DFL #1 to DFL #7) of a defect list DFL. The defect list is a list including a series of pairs each having a disc defect position and a position within a replacement area. As shown in this example, in the case where recording of data is performed on the disc 1 functioning as a write-once disc, the same list is written into each of the seven recording areas (DFL #1 to DFL #7) of the defect list DFL including the 28 cluster sections corresponding to respective cluster numbers 5 to 32.

FIG. 6 is a diagram illustrating a configuration of a DOS that is recorded at the start of a DMA.

In FIG. 6, a start byte of the DOS is denoted by a byte 0. The number of bytes shown in FIG. 6 denotes the number of bytes for each content of data.

The content of a two-byte area corresponding to byte positions 0 and 1 denotes a DDS identifier, which is "DS". The content of a one-byte area corresponding to a byte position 3 denotes a DDS model number (a format version). The content of a four-byte area corresponding to byte positions 4 to 7 denotes the number of updates of the DDS. In addition, in this example, the DMA is an area into which replacement management information is written during finalization processing, and the DMA itself is not updated, but the replacement management information is updated by using the TDMA. Therefore, when final finalization processing is performed, the number of updates of the DDS, the updates having been performed by using the TDMA, is recorded in the four-byte area corresponding to the byte positions 4 to 7.

The content of a four-byte area corresponding to byte positions 16 to 19 denotes a start physical sector address (AD-DRV) of the drive area included in the DMA. The content of a four-byte area corresponding to byte positions 32 to 35 denotes a start position of the user data area included in the data zone, that is, an address obtained by expressing the position of a logical sector number (LSN) "0" by a physical sector number (PSN).

The content of a four-byte area corresponding to byte positions 36 to 39 denotes a termination point of the user data zone included in the data zone, which is expressed by the logical sector number (LSN). The content of a four-byte area corresponding to byte positions 40 to 43 denotes a size of a replacement are included in the data zone. The content of a four-byte area corresponding to byte positions 44 to 47 denotes a size of a second replacement area included in the data zone. The content of a four-byte area corresponding to byte positions 48 to 51 is a size of the ISA included in the data zone.

The content of a one-byte area corresponding to a byte position 52 is a replacement-area available flag that indicates whether it is possible to perform rewriting of data by using a replacement area A, or not. When a condition, in which all of areas included in the ISA and/or all of areas included in the OSA have been completely used, occurs, the replacement-area available flag indicates the condition. Areas corresponding to byte positions other than the above-described byte positions are treated as reserved areas (undefined areas), and the content of each of the reserved areas is made be "00h".

As described above, the DDS is configured to include the addresses with respect to the user data area, the sizes of the ISA and the OSA, and the replacement-area available flag. That is, the DDS is management/control information for managing areas of the ISA and the OSA included in the data zone.

Figure 7:
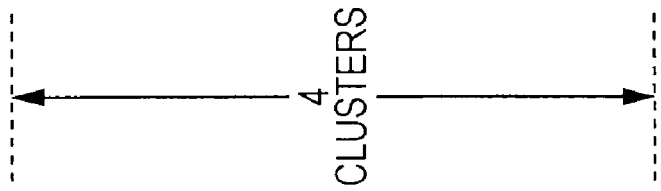
FIG. 7 is a diagram illustrating a structure of a defect list DFL that is used by a disc drive apparatus according to an embodiment of the present invention.

FIG. 7 is a diagram illustrating a structure of a defect list DFL. Here, byte positions shown in FIG. 7 denote respective byte positions of the contents of data included in the defect list DFL having an amount of data equal to four clusters of data. One cluster includes 32 sectors and 65536 bytes, that is, one sector has 2048 bytes. The number of bytes shown in FIG. 7 denotes the number of bytes as a size of the corresponding content of data.

The content of an area corresponding to 64 bytes from the start of the defect list DFL is defect list management information. In this defect list management information, information causing the present clusters to be recognized as clusters of the defect list, a version, the number of updates of the defect list, the number of entries included in the defect list are included. In an area following an area corresponding to a byte position 64, pieces of replacement address information ati each having 8 bytes are recorded as the contents of the entries included in the defect list. Further, immediately subsequent to an effective last piece of replacement address information ati #N, a piece of terminator information of 8 bytes, functioning as a termination of pieces of replacement address information, is recorded. In this defect list DFL, contents starting from content subsequent to the termination of pieces of replacement address information to a last content of the clusters are made be 00h.

Figure 8:
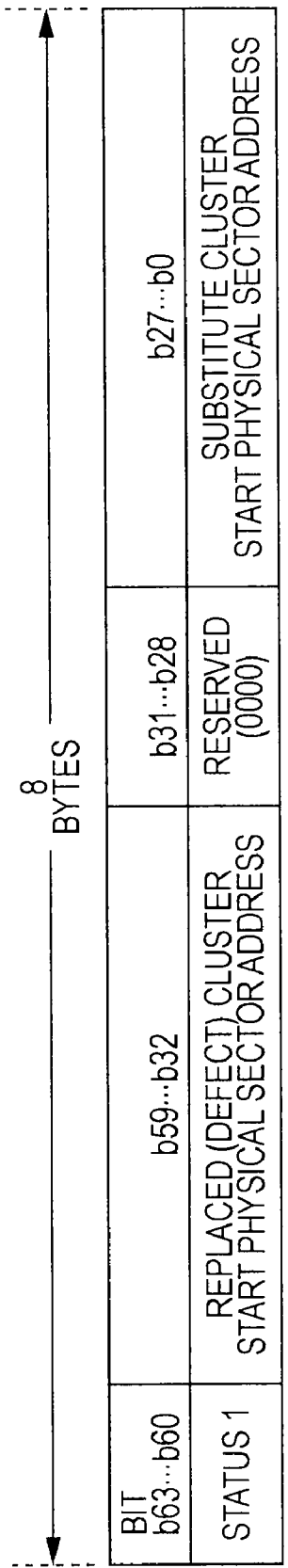
FIG. 8 is a diagram illustrating a structure of replacement address information ati that is used by a disc drive apparatus according to an embodiment of the present invention.

FIG. 8 is a diagram illustrating a configuration of a piece of replacement address information ati. The piece of replacement address information ati is configured by 8 bytes (64 bits). Each bit of the piece of replacement address information is denoted by b63 to b0. Status information (status 1) relating to entries is recorded in the bits b63 to b60. Here, status information "0000" denotes an entry of replacement processing for a defect. Further, since, in this embodiment, replacement areas for defects are also used as areas for recording tests, status information expressed by four bits, which indicates an entry of replacement processing for a recording test, is sometimes recorded. In bits b59 to b32, a start physical sector address PSN of a cluster targeted for replacement is recorded. Bits b31 to b28 are reserved. In bits b27 to b0, a start physical sector address PSN of a cluster, by which the cluster targeted for replacement is replaced, is recorded.

A piece of replacement address information ati having such a structure as described above is registered in the defect list DFL, such as shown in FIG. 6, as an entry.

[4. Explanation of Operations]

Next, operations performed by a disc drive apparatus according to this embodiment when a recording test is performed by using a user data zone of a disc will be described below.

Figure 9:
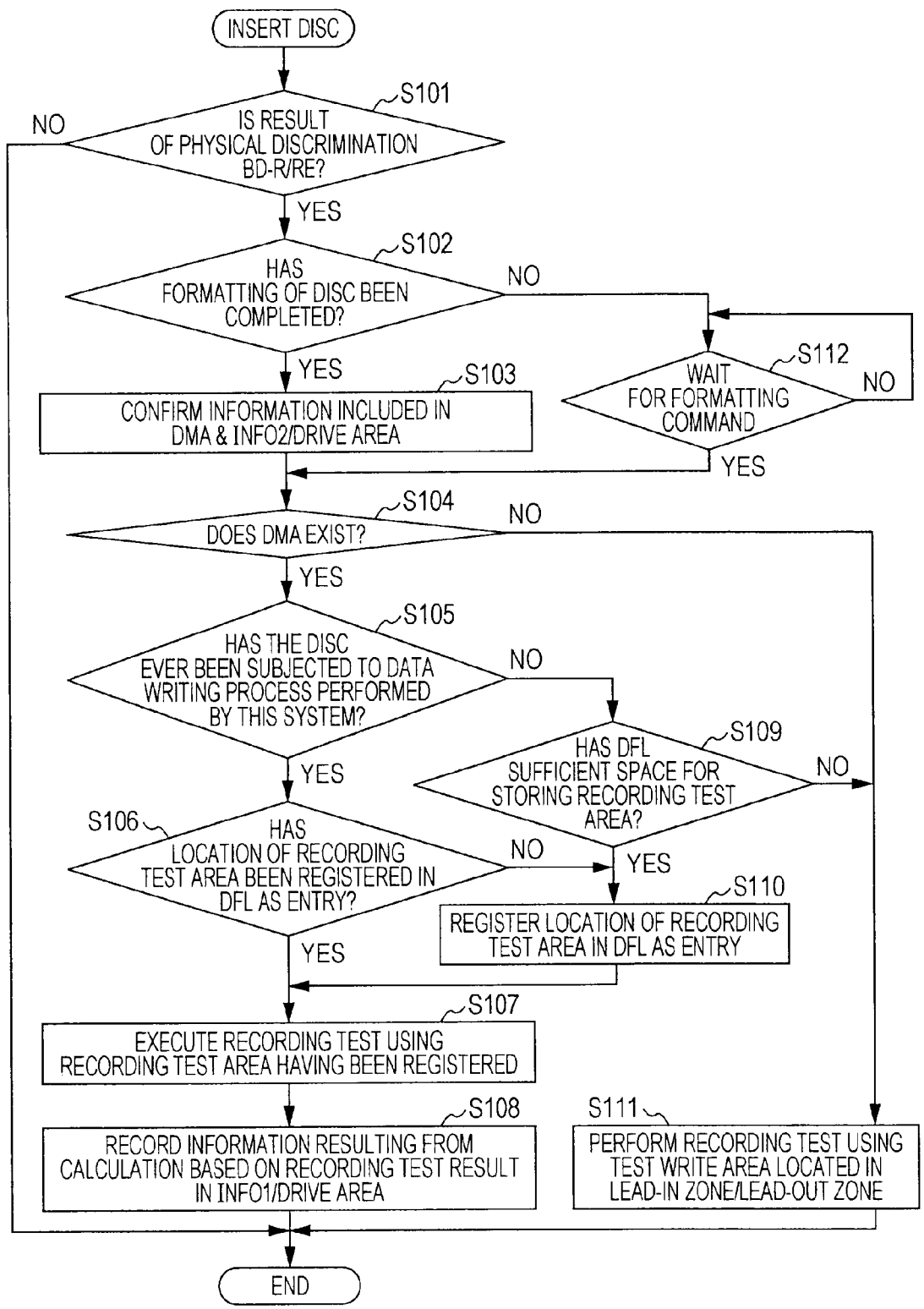
FIG. 9 is a flowchart illustrating an operation procedure of a recording test according to an embodiment of the present invention.

FIG. 9 is a flowchart illustrating a procedure of operations performed when such a recording test is performed.

Once the disc 1 is loaded, firstly, the system controller 60 performs setup processing prior to commencement of recording or reproduction processing performed on the disc 1. That is, the system controller 60 performs starting up and stabilizing of the spindle motor 52, red position control, and operations in picking up, such as focus searching, a focus servo on, and a tracking servo on, and further, discriminates a class of the loaded disc 1 by demodulating physical format information relating to the disc 1 from ADIP information having been modulated on wobble signals (step S101).

Here, if the class of the disc having been discriminated is one of classes of discs available for a recording test using a method according to this embodiment, that is, for example, a write-once disc, such as a BD-R disc and a BD-E disc, or a rewritable disc, the system controller 60 causes the process flow to proceed to subsequent processing for a record testing. Further, if the class of the disc having been discriminated is one of classes of discs other than the classes of discs available for a recording test using a method according to this embodiment, that is, recording-disabled discs, such as a read-only BD, the system controller terminates this processing for a recording test, and then, for example, executes processing for ejecting the disc and the like.

If the process flow proceeds to processing for the recording test, subsequently, the system controller 60 determines whether formatting of the relevant disc has been completed, or not (step S102). This determination is made by investigating the existence or nonexistence of the structure of the disc areas such as shown in FIG. 3. Here, the BCA and the prerecorded information area PR are areas dedicated to reproduction, and in the disks, for which formatting has not yet been completed, only the areas dedicated to reproduction are provided. If formatting of the relevant disk has not yet been completed, the system controller waits for a formatting command from the AV system 120 (step S112). Upon receipt of the formatting command from the AV system 120, the system controller 60 performs formatting processing to form the structure of the disc areas, such as shown in FIG. 3 (step S112).

In step S102, if it is determined that formatting of the loaded disc 1 has already been completed, the system controller 60 confirms a piece of information included in either of the two DMAs (i.e., the DMA 1 or the DMA 2), which are included in the two information areas Info 1 and Info 2, respectively, and a piece of information included in the drive area included in the Info 2 (step S103). Further, on the basis of the result of the confirmation, the system controller 60 makes a determination as described blow.

Firstly, the system controller 60 determines the existence or nonexistence of the DMAs (the DMA 1 and the DMA 2), which are included in the two information areas Info 1 and Info 2, respectively (step S104). If the relevant disc is a disc, for which formatting was performed under the condition in which replacement processing on defect areas is disabled, the DMAs are not provided in the information areas info 1 and info 2, respectively. Therefore, in such a case, in step S104, the determination results in the "nonexistence of the DMAs". In this case, the system controller 60 performs control so that a normal recording test using test write areas OPCs 0, which are included in the lead-in zone and the lead-out zone, respectively, is performed (step S111). If, in step S104, the determination results in the "existence of the DMAs", the system controller 60 causes the process flow to proceed to next step S105, where the recording test is executed.

In step S105, on the basis of drive IDs having been recorded in the drive area of the information area Info 2, the system controller 60 determines whether the relevant disc 1 is the disc 1 for which a recording operation has ever been performed by the present disc drive apparatus 10, or not. If the relevant disc 1 is the disc 1 that has been first loaded into the present disc drive apparatus 10, any drive IDs included in the drive area do not correspond to a drive ID assigned to present disc drive apparatus 10. In this case, it is determined that the relevant disc 1 is the disc 1 for which recording operations have ever been performed by apparatuses other than the present disc drive apparatus 10, and the system controller 60 causes the process flow to proceed to step S109.

In step S109, the system controller 60 determines whether the defect list DFL included in the DMA has a sufficient space, or not. If the defect list DFL included in the DMA has no sufficient space, the system controller 60 determines that it is difficult to use any areas included in the user data zone as an area for a recording test, and performs control so that a normal recording test using the test write areas OPCs 0, which are included in the lead-in zone and the lead-out zone, respectively, is performed (step S111). If the defect list DFL included in the DMA has a sufficient space, the system controller 60 (a setting section) registers a pair of a position of an area for a recording test, the area being included in the user data zone, and a position within a replacement area, in addition to a piece of status information expressed by four bits, which indicates that the paired piece of information is an entry for replacement processing for a recording test, in the defect list DFL as an entry for a recording test (step S110). Subsequently, the system controller 60 causes the process flow to proceed to step S107.

In contrast, if, in step S105, it is determined that any one of drive IDs included in the drive area of the information area Info 2 corresponds to a drive ID assigned to the present disc drive apparatus 10, the determination indicates that the relevant disc 1 is the disc 1, for which at least one recording operation (including a recording test) has ever been performed by the present disc drive apparatus 10. In this case, in order to know whether the disc 1 is the disc 1 for which a recording test has ever been performed, or not, the system controller 60 investigates whether at least one entry for a recording test is registered in the defect list DFL included in the DMA, or not, by referring to a piece of status information included in each entry (in step S106). If it is determined that any entries for recording tests are not registered therein, the determination indicates that the relevant disc 1 is the disc 1 for which any recording tests have not yet been performed. In this case, therefore, the system controller 60 registers a pair of a position of an area for a record test, the area being included in the user data zone, and a position within a replacement area, in addition to a piece of status information expressed by four bits, which indicates that the paired piece of information is an entry for replacement processing for a recording test, in the defect list DFL as an entry for a recording test (step S110). Subsequently, the system controller 60 causes the process flow to proceed to step S107.

In step 107, on the basis of the content of a piece of data (a position of an area for a recording test, included in the user data zone) having been registered in the defect list DFL as an entry for a recording test, the system controller 60 (an adjustment section) performs control so that a record testing is executed by using the area for a recording test (step S107). Further, on the basis of data obtained by performing this recording test, the system controller 60 performs arithmetic operations with respect to optimal recording conditions, such as a recording and reproduction laser power output condition and a laser drive pulse waveform condition, and records the results in the drive area included in the information area Info 1 (step S108).

Such a method as described above enables performing recording tests using the user data zone. That is, for example, in FIG. 1, it is possible to perform recording tests using the middle circumference portion of a disc, and further, perform recording tests for all over the area in the radius direction of the disc.

Second Embodiment

[1. Outline of Tilt Adjustment Method Using Replacement System]

Next, as a second embodiment according to the present invention, a method for performing a tilt adjustment using a replacement system for defects will be described below.

Figure 10:
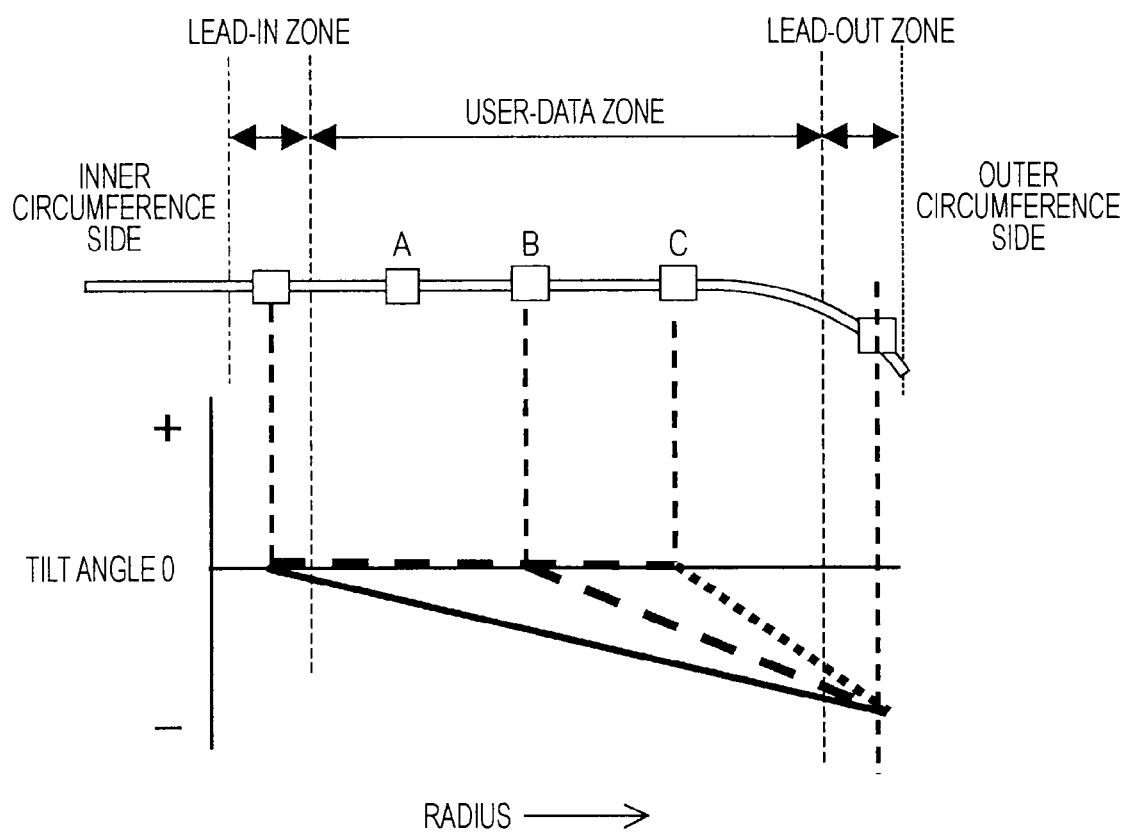
FIG. 10 is a diagram illustrating an outline of a tilt adjustment performed by a disc drive apparatus according to an embodiment of the present invention.

FIG. 10 is a diagram illustrating an outline of the tilt adjustment. In FIG. 10, a horizontal axis denotes a radius direction, the left side thereof being the inner circumference side thereof, the right side thereof being the outer circumference thereof. In the case of a disc shown in FIG. 10, large warpage is not recognized at the inner circumference portion and the middle circumference portion, but is recognized at the outer circumference portion. Usually, the tilt adjustment is performed by recording signals for measuring tilt angles in test write areas OPCs 0 included in the lead-in zone and the lead-out zone that are provided at the inner circumference side and at the outer circumference side, respectively, and measuring an amount of jitters included in signals, such as RF signals, resulting from reproduction of the signals for measuring tilt angles. In such a case, tilt angles at the middle circumference portion of the disc are obtained by applying a method of linear interpolation to tilt angles that are measured at the inner circumference portion and the outer circumference portion, respectively. Therefore, in the case of the disc for which large warpage is recognized only at the outer circumference portion of the disc, it is difficult to obtain accurate tilt angles all over the disc.

In order to enable measuring tilt angles by using the user data zone between the lead-in zone and the lead-out zone, a disc drive apparatus according to this embodiment enables using the replacement areas for defects as areas for tilt adjustments as well. One or more areas for tilt adjustments that are provided in the user data zone are necessary, and in an example of FIG. 10, a case, in which three areas A, B and C for tilt adjustments are set, is shown. Further, from a viewpoint of accuracy of tilt adjustments, it is desirable to set areas, which include the areas A, B and C for tilt adjustment and test write areas OPCs 0 included in the lead-in zone and the lead-out zone, so as to be located at positions that equally divide the radius of a disc. Further, from a viewpoint of accuracy of tilt adjustments, it is also desirable to provide the areas for tilt adjustments as many as possible.

In addition, in order to perform measurement of tilt angles for all areas extending in the radius direction of a disc, it is desirable to also use the test write areas OPCs 0, which are included in the lead-in zone and the lead-out zone, respectively, for the measurement of tilt angles as usual.

A configuration of a disc drive apparatus according to this embodiment is the same as that of the disc drive apparatus according to the first embodiment, such as shown in FIG. 2, and therefore, is omitted from description herein.

With respect to disc management information, only respects different from those of the first embodiment will be described below.

In the defect list DFL, as a piece of status information relating to an entry, it is possible to record status information expressed by four bits, which indicates that the entry is related to an entry for replacement processing for measuring tilt angles.

Further, the drive area of the information area Info 1 can be configured to record therein tilt adjustment information resulting from arithmetic operations performed on the basis of results of tilt angle measurements. An optical disc drive apparatus according to this embodiment is capable of reading out tilt adjustment information from the drive area of the information area Info 1 before performing recording or reproduction of data, and concurrently with performing tilt adjustments in accordance with the read-out tilt adjustment information, the optical disc drive apparatus according to this embodiment is capable of performing recording or reproduction of data.

[2. Explanation of Operations]

Next, operations performed by a disc drive apparatus according to this embodiment when a tilt angle measurement is performed by using a user data zone of a disc will be described below.

Figure 11:
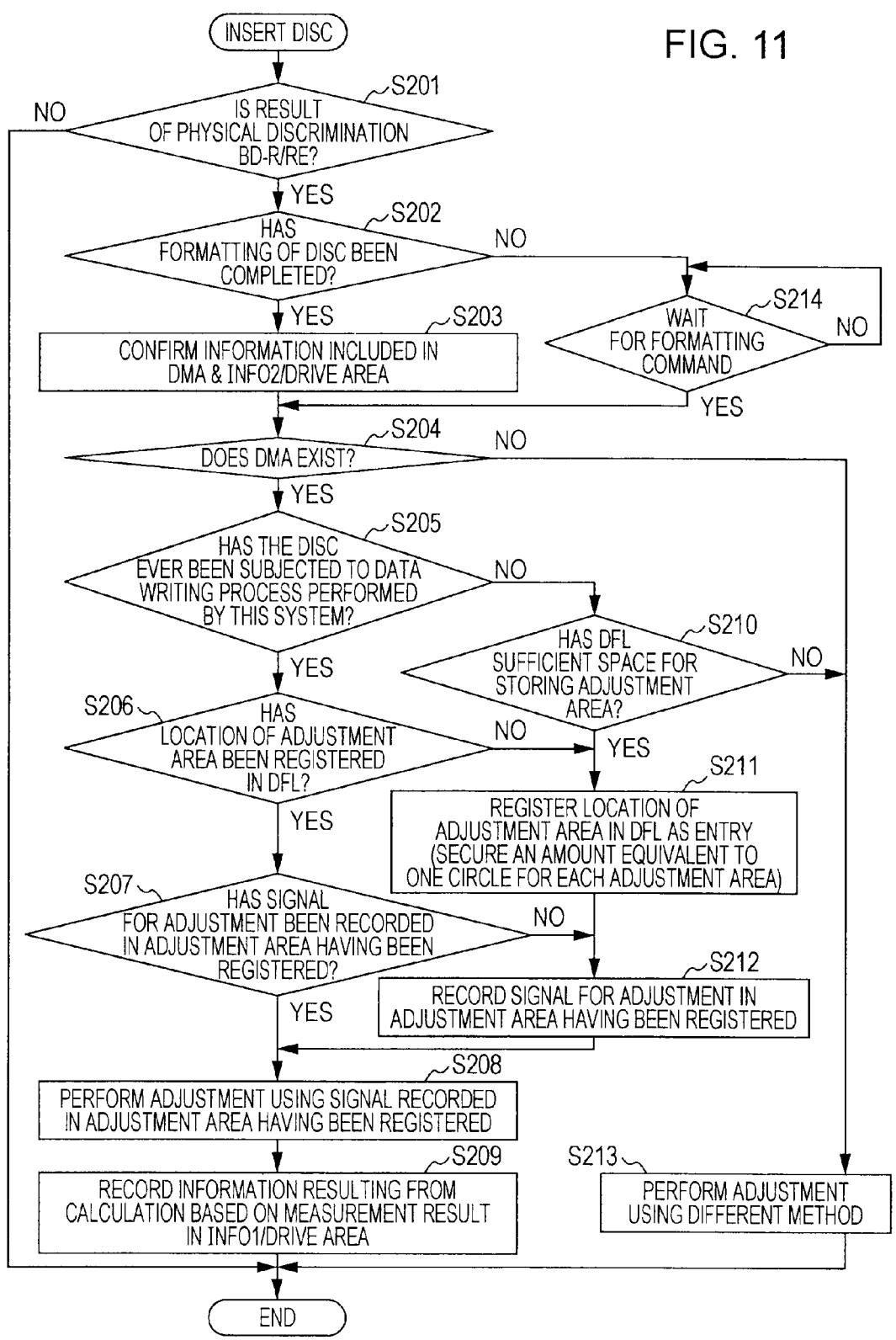
FIG. 11 is a flowchart illustrating an operation procedure of a tilt angle adjustment according to an embodiment of the present invention.

FIG. 11 is a diagram illustrating a procedure of operations performed when such a tilt angle adjustment is performed.

Once the disc 1 is loaded, firstly, the system controller 60 performs setup processing prior to commencement of recording or reproduction processing on the disc. That is, the system controller 60 performs starting up and stabilizing of the spindle motor 52, red position control, and operations in picking up, such as focus searching, a focus servo on, and a tracking servo on, and further, discriminates a class of the loaded disc 1 by demodulating physical format information relating to the disc 1 from ADIP information having been modulated on wobble signals (step S201).

Here, if the class of the disc having been discriminated is one of classes of discs available for a tilt angle measurement using a method according to this embodiment, that is, for example, a write-once disc, such as a BD-R disc and a BD-E disc, or a rewritable disc, the system controller 60 causes the process flow to proceed to subsequent processing for a tilt angle measurement. Further, if the class of the disc having been discriminated is one of classes of discs other than the classes of discs available for a tilt angle measurement using a method according to this embodiment, that is, recording-disabled discs, such as a read-only BD, the system controller terminates this tilt angle measurement processing, and then, for example, executes processing for ejecting the disc and the like.

If the process flow proceeds to processing for measuring tilt angles, subsequently, the system controller 60 determines whether formatting of the relevant disc has been completed, or not (step S202). If formatting of the relevant disk has not yet been completed, the system controller waits for a formatting command from the AV system 120 (step S114). Upon receipt of the formatting command from the AV system 120, the system controller 60 performs formatting processing for forming the structure of the disc areas, such as shown in FIG. 3 (step S214).

In step S202, if it is determined that formatting of the loaded disc 1 has already been completed, the system controller 60 confirms a piece of information included in either of the two DMAs (i.e., the DMA 1 or the DMA 2), the two DMAs being included in the two information areas Info 1 and Info 2, respectively, and a piece of information included in the drive area included in the Info 2 (step 203). Further, on the basis of the result of the confirmation, the system controller 60 makes a determination as described blow.

Firstly, the system controller 60 determines the existence or nonexistence of the DMAs (i.e., the DMA 1 and the DMA 2), which are included in the two information areas Info 1 and Info 2, respectively (step S204). If the relevant disc 1 is the disc 1 for which formatting was performed under the condition in which replacement processing using the defect areas is disabled, the DMAs are not provided in the information areas info 1 and info 2, respectively. Therefore, in such a case, in step S204, the determination results in the "nonexistence of the DMAs". In this case, the system controller 60 performs control so that a tilt angle measurement using a method other than a method according to this embodiment is performed (step S213). If, in step S104, the determination results in the "existence of the DMAs", the system controller 60 causes the process flow to proceed to next step S205, where a tilt angle adjustment according to this method is executed.

In step S205, on the basis of drive IDs having been recorded in the drive area of the information area Info 2, the system controller 60 determines whether the relevant disc 1 is the disc 1, for which a recording operation has ever been performed by the present disc drive apparatus 10, or not. If the relevant disc 1 is the disc 1 that has been first loaded into the present disc drive apparatus 10, any drive IDs included in the drive area do not correspond to a drive ID assigned to the drive ID. In this case, it is determined that the relevant disc 1 is the disc 1, for which recording operations have ever been performed by apparatuses other than the present disc drive apparatus 10, and the system controller 60 causes the process flow to proceed to step S210.

In step S210, the system controller determines whether the defect list DFL included in the DMA has a sufficient space, or not. If the defect list DFL included in the DMA has no sufficient space, the system controller 60 determines that it is difficult to use any areas included in the user data zone as an area for a tilt angle measurement, and performs control so that a tilt angle measurement using a method other than a method according to this embodiment are performed (step S213). If the defect list DFL included in the DMA has a sufficient space, the system controller 60 (a setting section) registers a pair of a position of an area for a tilt angle measurement and a position within a replacement area, which are included in the user data zone, in addition to a piece of status information expressed by four bits, which indicates that the paired piece of information is an entry for replacement processing for a tilt angle measurement using a method according to this embodiment, in the defect list DFL as an entry for a tilt angle measurement (step S211). Here, the area for a tilt angle measurement to be secured in the user data zone is sufficient for recording therein measurement data having an amount equal to that of data resulting from a tilt angle measurement for at least one circle of a disc. Subsequently, the system controller 60 records signals for a tilt adjustment in the area for tilt angle measurements, the area having been set in the user data zone (step S212), and then, causes the process flow to proceed to step S208.

In contrast, if, in step S205, it is determined that any one of drive IDs included in the drive area of the information area Info 2 corresponds to a drive ID assigned to the present disc drive apparatus 10, the determination indicates that the relevant disc 1 is the disc 1 for which at least one recording operation (including recording of signals for tilt angle measurements) has ever been performed by the present disc drive apparatus 10. In this case, in order to know whether the disc 1 is the disc 1 for which at least one recording operation with respect to signals for tilt angle measurements has ever been performed, or not, the system controller 60 investigates whether at least one entry for a tilt angle measurement is registered in the defect list DFL included in the DMA, or not, by referring to a piece of status information included in each entry (in step S206). If it is determined that any entries for tilt angle measurements are not registered therein, the determination indicates that the relevant disc 1 is the disc 1 for which any recording operations for tilt angle measurements have not yet been performed. In this case, therefore, the system controller 60 registers a pair of a position of an area for a tilt angle measurement, the area being included in the user data zone, and a position within a replacement area, in addition to a piece of status information expressed by four bits, which indicates that the paired piece of information is an entry for replacement processing for a tilt angle measurement according to this method, in the defect list DFL as an entry for a tilt angle measurement (step S211).

If, in step S206, it is determined that at least one entry for a tilt angle measurement is registered in the defect list, the system controller 60 investigates whether signals for a tilt angle measurement are recorded in the area for tilt angle measurements, or not (in step S207). If, as a result of the investigation, it is determined that any entries for tilt angle measurements are not registered in the defect list, the system controller 60 records signals for a tilt angle measurement in the area for tilt angle measurements (step S212), and then, causes the process flow to proceed to step 208. If it is determined that at least one entry for a tilt angle measurement is registered in the defect list, the system controller 60 causes the process flow to directly proceed to step S208.

In step S208, the system controller 60 (an adjustment section) reproduces signals that are recorded in the area for tilt angle measurements included in the user data zone, and performs control so as to measure tilt angles on the basis of an amount of jitters included in the resultant reproduced signals, such as RF signals. Further, the system controller 60 obtains an amount of tilt adjustments by performing an arithmetic operation on the results of tilt angle measurements (step S208). In this case, by calculating amounts of tilt angle adjustments, corresponding to respective radius positions of the disc 1, from results of measurements of tilt angles for respective inner and outer circumference portions, having been obtained by using respective test write areas included in the lead-in zone and the lead-out zone, and results of measurements of tilt angles for the middle circumference portion of the disc, having been obtained by using the areas for tilt angle measurements included in the user data zone according to this flowchart, it is possible to obtain highly accurate amounts of tilt angle adjustments all over the areas located in the radius direction of the disc 1. Finally, the system controller 60 records the obtained amounts of tilt angle adjustments in the drive area included in the information area Info 1 (step S209).

MODIFIED EXAMPLE 1

Hereinbefore, embodiments, in which a portion of recording areas for adjustments is an area for a recording test or an area for a tilt adjustment, have been described, but a portion of the recording areas for adjustments may be used as a trace area. The trace area is an area for causing the optical pick-up 51 to wait until an occurrence of a next seeking command during a reproduction operation. In a reproduction mode, laser light beams for reading out data are irradiated from the optical pick-up 51 towards the surface of a disc, and therefore, the prolonged irradiation of the laser light beams onto the same position of the disc during the waiting period of time is likely to cause changes of the condition of recording layers. Therefore, by replacing a portion of the user data zone by a replacement area and setting the portion of the user data as a trace area, it is possible to allow the optical pick-up 51 to wait without substantially giving any damages to data that is recorded on the disc.

Figure 12:
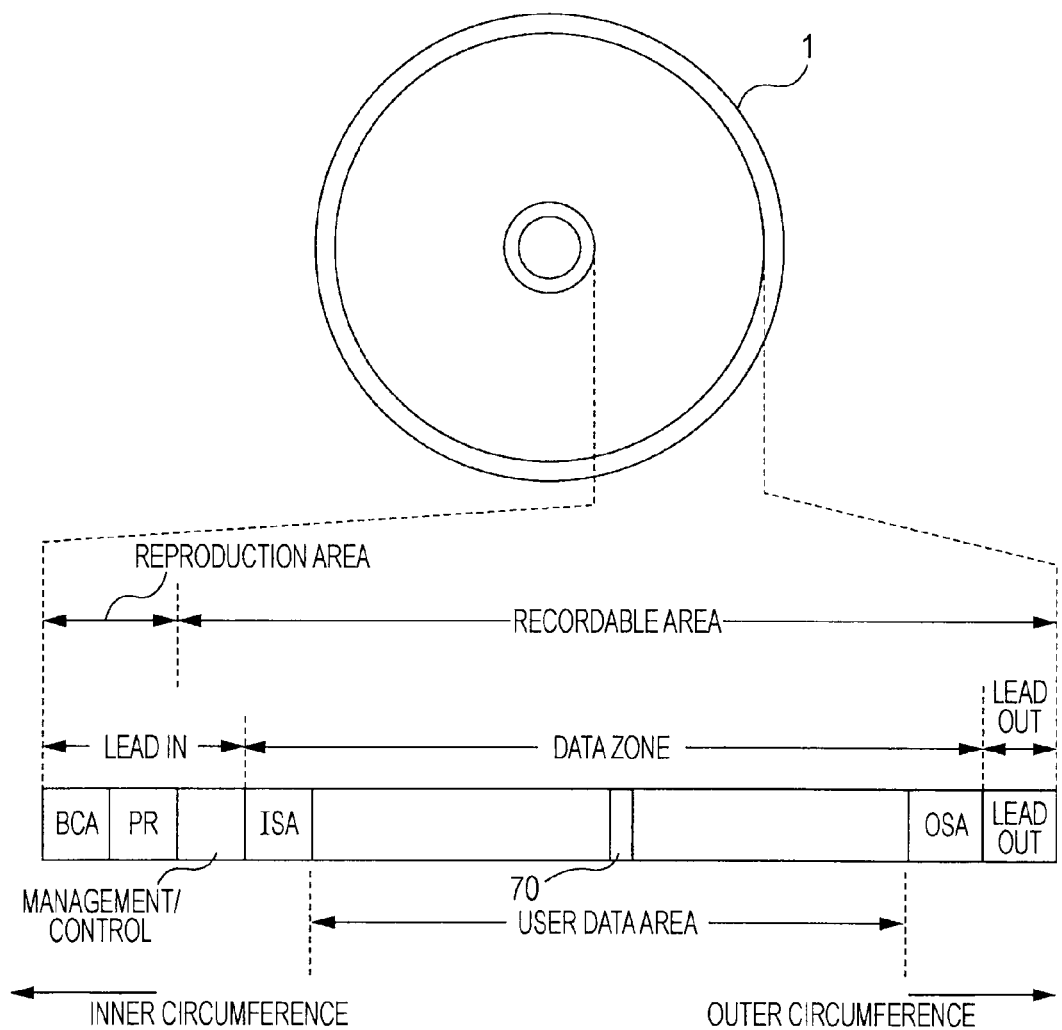
FIG. 12 is a diagram illustrating an example of setting of a trace area used by a disc drive apparatus according to an embodiment of the present invention.

As shown in FIG. 12, with respect to the position of the trace area 70 within the user data zone, it is desirable to allocate the trace area 70 at a center portion of the user data zone, or at an approximately center portion of the user data zone, so that an average amount of seeking can be minimized. Further, the trace area may be provided for each of a plurality of areas resulting from segmentation of the user data zone in accordance with positions along the radius of a disc.

The present application contains subject matter related to that disclosed in Japanese Priority Patent Application JP 2009-221447 filed in the Japan Patent Office on Sep. 25, 2009, the entire content of which is hereby incorporated by reference.

Hereinbefore, the disc 1 and the corresponding disc drive apparatus 10 according to embodiments of the present invention have been described; however, the present invention is not limited to the above-described examples thereof, but various modified examples may be considered within the scope of the gist of the present invention.

What is claimed is:

1. A recording apparatus that performs recording of data on a disc-shaped recording medium including a recording area, which records user data therein, and replacement areas, which replace a defect area included in the recording area, the recording apparatus comprising:
    a setting unit that sets a portion of the recording area to include the replacement areas such that a first replacement area is contained in one end of the recording area and a second replacement area is contained in an opposite end of the recording area, and sets the portion of the recording area as an area for adjustment; and
    an adjustment unit that performs adjustment via the area for adjustment,
    wherein the setting unit sets, as the area for adjustment, a trace area at a center portion or an approximately center portion of the recording area.

2. The recording apparatus according to claim 1, wherein the setting unit sets a recording test area, which is used for obtaining an optimal recording condition, as the area for adjustment.

3. The recording apparatus according to claim 2, wherein the recording area is segmented into a plurality of regions, recording rates corresponding to the respective regions are different from one another, and
    the setting unit sets the recording test area in an area including a point at which the recording rate is changed.

4. The recording apparatus according to claim 1, wherein the setting unit sets an area for tilt adjustment, the area being used to perform tilt adjustment, as the area for adjustment.

5. The recording apparatus according to claim 4, wherein the setting unit sets the area for tilt adjustment at intervals resulting from equally segmenting the recording area.

6. The recording apparatus according to claim 5, wherein the adjustment unit records a signal in the area for tilt adjustment, and
    calculates information for tilt adjustment on the basis of a signal obtained by reproducing the recorded signal.

7. The recording apparatus according to claim 1, further comprising:
    a reproduction unit including an optical pick-up to reproduce data from the recording medium,
    wherein the setting unit sets the trace area at a position corresponding to a position at which the optical pick-up is in a waiting condition during a reproduction operation.

8. A recording method for recording data on a disc-shaped recording medium including a recording area, which records user data therein, and replacement areas, which replace a defect area included in the recording area, the recording method comprising the steps of:
    setting, via a setting unit, a portion of the recording area to include the replacement areas such that a first replacement area is contained in one end of the recording are and a second replacement area is contained in an opposite end of the recording area;
    setting, via the setting unit, the portion of the recording area as an area for adjustment; and performing, via an adjustment unit, adjustment via the area for adjustment, wherein the setting unit sets, as the area for adjustment, a trace area at a center portion or an approximately center portion of the recording area.

9. A recording apparatus that performs recording of data on a disc-shaped recording medium including a recording area, which records user data therein, and replacement areas, which replace a defect area included in the recording area, the recording apparatus comprising:

setting means for setting a portion of the recording area to include the replacement areas such that a first replacement area is contained in one end of the recording are and a second replacement area is contained in an opposite end of the recording area, and setting the portion of the recording area as an area for adjustment; and adjustment means for performing adjustment via the area for adjustment, wherein the setting means sets, as the area for adjustment, a trace area at a center portion or an approximately center portion of the recording area.

10. The recording apparatus according to claim 1, wherein the recording area further includes a plurality of data management areas having information to manage replacement of defect areas, the information includes a defect list having a series of pairs each having a position of an area within the recording area for a tilt angle measurement and a position within the first or second replacement areas.

11. The recording apparatus according to claim 10, wherein, when the recording medium is a write-once disc, each defect list contains the same information.

12. The recording apparatus according to claim 10, wherein the setting portion only sets the portion of the recording area as the area of adjustment in response to determining that the defect list contains sufficient space.

13. The recording apparatus according to claim 10, wherein the setting unit sets the portion based on the information of the data management areas, and the adjustment unit performs adjustment based on the information of the data management area.

\* \* \* \* \*